United States Patent
Persson et al.

(10) Patent No.: US 8,877,152 B2
(45) Date of Patent: Nov. 4, 2014

(54) OXIDATION SYSTEM AND METHOD FOR CLEANING WASTE COMBUSTION FLUE GAS

(71) Applicant: ALSTOM Technology Ltd, Baden (CH)

(72) Inventors: Daniel Per Niklas Persson, Växjö (SE); Mati Maripuu, Växjö (SE); Marja Swahn, Växjö (SE)

(73) Assignee: ALSTOM Technology Ltd, Baden (CH)

( * ) Notice: Subject to any disclaimer, the term of this patent is extended or adjusted under 35 U.S.C. 154(b) by 5 days.

(21) Appl. No.: 13/848,947

(22) Filed: Mar. 22, 2013

(65) Prior Publication Data

US 2014/0241971 A1 Aug. 28, 2014

Related U.S. Application Data

(60) Provisional application No. 61/769,982, filed on Feb. 27, 2013.

(51) Int. Cl.
| | | |
|---|---|---|
| *B01D 53/50* | (2006.01) | |
| *B01D 53/74* | (2006.01) | |
| *B01D 53/78* | (2006.01) | |
| *F01N 3/08* | (2006.01) | |
| *B01D 53/86* | (2006.01) | |

(52) U.S. Cl.
CPC ............ *B01D 53/502* (2013.01); *F01N 3/0814* (2013.01); *B01D 53/501* (2013.01); *B01D 53/8609* (2013.01); *B01D 53/869* (2013.01); *B01D 2251/102* (2013.01); *B01D 2251/11* (2013.01); *B01D 2251/304* (2013.01); *B01D 2255/20738* (2013.01); *B01D 2257/2045* (2013.01); *B01D 2257/406* (2013.01); *B01D 2258/0291* (2013.01)
USPC .............. 423/242.1; 423/243.01; 423/244.01; 423/244.07; 423/243.07; 422/168; 422/169; 422/170

(58) Field of Classification Search
USPC ............... 423/242.1, 243.01, 243.07, 243.08, 423/244.01, 244.07; 422/168–170
See application file for complete search history.

(56) References Cited

U.S. PATENT DOCUMENTS

| | | | |
|---|---|---|---|
| 2,418,167 A | * | 4/1947 | Du Bois ......................... 162/38 |
| 3,914,387 A | | 10/1975 | Von Jordan et al. |

(Continued)

FOREIGN PATENT DOCUMENTS

| | | | | |
|---|---|---|---|---|
| DE | 33 30 331 A1 | * | 3/1984 | ............... 423/244.01 |
| EP | 2 353 701 A1 | | 8/2011 | |
| JP | 54-72771 A | * | 6/1979 | ............... 423/243.07 |

OTHER PUBLICATIONS

European Search Report—EP Appln. No. 14156586.1, dated Jun. 13, 2014.

*Primary Examiner* — Timothy Vanoy
(74) *Attorney, Agent, or Firm* — Rita D. Vacca

(57) ABSTRACT

Methods and systems for the removal of SO2 from waste combustion flue gas are described herein. One such system for removing $SO_2$ from waste combustion flue gas containing $SO_2$ uses a semi-dry desulfurization system for contacting the flue gas with a solvent moistened absorption material. Thereafter, a recirculated water quench is used for contacting the flue gas with recirculated water at a relatively low pH, followed by a condenser used for contacting the flue gas with a water spray. Additionally, a NaOH supply for supplying NaOH to the condenser and an oxidizing catalyst supply for supplying an oxidizing catalyst to the condenser, are likewise used to produce cleaned flue gas for release to the atmosphere.

15 Claims, 3 Drawing Sheets

(56) References Cited

U.S. PATENT DOCUMENTS

| | | |
|---|---|---|
| 4,213,945 A | 7/1980 | Haese et al. |
| 4,239,737 A | 12/1980 | Ermini |
| 4,248,842 A | 2/1981 | Kaupisch ............ 423/243.07 |
| 4,284,608 A * | 8/1981 | Pessel .................... 423/243.07 |
| 4,990,315 A | 2/1991 | Colley |
| 5,100,634 A | 3/1992 | Long |
| 6,217,839 B1 * | 4/2001 | Hess et al. ............... 423/243.01 |
| 8,535,631 B2 * | 9/2013 | Strickroth .................... 423/220 |
| 2004/0047773 A1 | 3/2004 | Kato et al. |
| 2006/0057047 A1 * | 3/2006 | Schoubye et al. ......... 423/242.1 |
| 2007/0154373 A1 | 7/2007 | Johnson et al. |
| 2008/0145290 A1 * | 6/2008 | Daum et al. ............... 423/242.1 |
| 2008/0199379 A1 * | 8/2008 | Bogenstatter et al. ... 423/243.01 |
| 2010/0111777 A1 | 5/2010 | Klingspor et al. |
| 2013/0058854 A1 * | 3/2013 | Mollerhoj et al. ......... 423/242.1 |
| 2013/0129591 A1 * | 5/2013 | Wen et al. ................ 423/244.08 |

\* cited by examiner

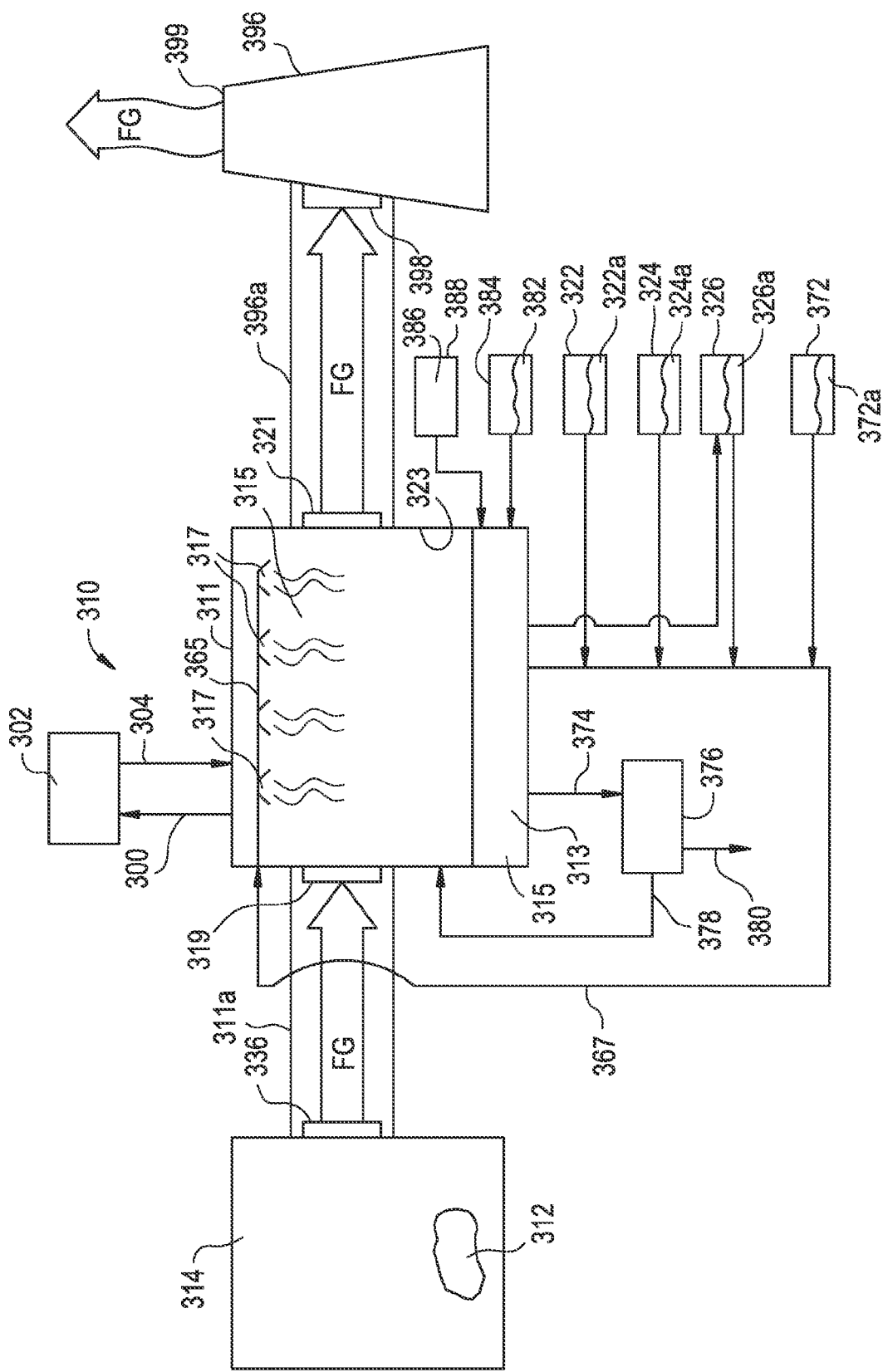

OXIDATION SYSTEM AND METHOD FOR CLEANING WASTE COMBUSTION FLUE GAS

CROSS-REFERENCE TO RELATED APPLICATION

This application claims the benefit of U.S. Provisional Patent Application Ser. No. 61/769,982; filed on Feb. 27, 2013, which is incorporated herein by reference in its entirety.

FIELD OF THE INVENTION

The present disclosure relates, in general, to the removal of contaminants from flue gas produced by the burning of waste as a combustion fuel and, in particular, to a new and useful method and system for removing $SO_2$ from the flue gas produced by waste fuel combustion.

BACKGROUND OF THE INVENTION

In the pollution control field, several approaches are used to remove sulfur oxides and other contaminants from a flue gas produced by the burning of a fossil fuel in order to comply with both European and U.S. emissions requirements.

One approach involves locating and utilizing fossil fuels lower in sulfur content and/or other contaminants. A second approach involves removing or reducing the sulfur content and/or other contaminants in the fuel prior to combustion of the fuel. Such may be achieved through mechanical and/or chemical processes. A major disadvantage to this second approach is the limited cost effectiveness of the mechanical and/or chemical processes required to achieve the mandated levels of reduction of sulfur oxides and/or other contaminants.

By and large, the most widely used approaches to removing sulfur oxides and/or other contaminants from flue gas involve post-combustion clean up of the flue gas. Several methods have been developed to remove $SO_2$ species from flue gases.

One method for removing $SO_2$ from flue gas involves either mixing dry alkali material with the fuel prior to combustion, or injection of pulverized alkali material directly into the hot combustion gases to remove sulfur oxides and other contaminants via absorption or absorption followed by oxidation. Disadvantages of this method include: fouling of heat transfer surfaces; low to moderate removal efficiencies; poor reagent utilization; and increased particulate loadings in the combustion gases which may require additional conditioning of the gas if an electrostatic precipitator is used for down stream particulate collection.

Another method for removing $SO_2$ from flue gas, collectively referred to as wet chemical absorption processes and also known as wet scrubbing, involves "washing" the hot flue gases with an aqueous alkaline solution or slurry in an up-flow, gas-liquid contact device to remove sulfur oxides and other contaminants. Disadvantages associated with wet scrubbing processes include: the loss of liquid both to the atmosphere and to the sludge produced in the process; and the economics associated with the construction materials for the absorber module itself and all related auxiliary downstream equipment, such as primary/secondary dewatering and waste water treatment subsystems.

Still another method for removing $SO_2$, collectively referred to as spray drying chemical absorption processes and also known as dry scrubbing, involves spraying an aqueous alkaline solution or slurry which has been finely atomized via mechanical, dual-fluid or rotary cup-type atomizers, into the hot flue gases to remove sulfur oxides and other contaminants. Disadvantages associated with these dry scrubbing processes include: moderate to high gas-side pressure drop across the spray dryer gas inlet distribution device; and limitations on the spray down temperature required to maintain controlled operations.

Other known systems for $SO_2$ removal from flue gas require additional equipment, are very complicated in design and operation, and/or provide a very costly removal method. It is thus apparent that a simple and economical method and system is needed to remove $SO_2$ from flue gas in general, and particularly to remove $SO_2$ from flue gas produced by the burning of waste, that overcomes the disadvantages of these prior approaches used in fossil fuel combustion fields.

SUMMARY OF THE INVENTION

The present invention is directed to a system and process for removing $SO_2$ from flue gases produced by waste combustion through absorption of $SO_2$ to form $SO_3^{2-}$ and $SO_4^{2-}$ for efficient and cost effective capture.

$SO_2$ removal in wet scrubbers and condensers is facilitated by absorption of $SO_2$ into the liquid phase according to Reaction 1 provided below.

$$SO_2\ (g) + H_2O\ (l) \leftrightarrow H_2SO_3\ (aq) \qquad \text{Reaction 1}$$

Since the equilibrium of Reaction 1 rapidly saturates the liquid, the sulfur transforms into an ionic form according to Reaction 2 and Reaction 3 provided below.

$$H_2SO_3 \leftrightarrow HSO_3^- + H^+ \qquad \text{Reaction 2}$$

$$HSO_3^- \leftrightarrow SO_3^{2-} + H^+ \qquad \text{Reaction 3}$$

Transformation of the sulfur to the ionic form is facilitated by increasing the pH to thereby push the equilibrium toward the $SO_3^{2-}$ form. An increase in pH however also increases $CO_2$ dissolution into the liquid, which in turn increases the consumption of NaOH, or other alkali sorbent used in the system, making the system more costly. The methods of the present disclosure therefore are based on oxidizing $SO_3^{2-}$ according to Reaction 4 provided below.

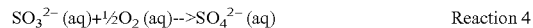

$$SO_3^{2-}\ (aq) + \tfrac{1}{2}O_2\ (aq) \rightarrow SO_4^{2-}\ (aq) \qquad \text{Reaction 4}$$

Reaction 4 is quite slow and thereby inadequate for commercial purposes. However, with the addition of a catalyst, the reaction rate can be adequately increased. As such, sulfur removal by capture through Reaction 4 requires only compensation of the loss of catalyst, as no sorbent is consumed.

In fields using fossil fuel combustion and limestone as a cleaning system absorbent, sulfur removal is accomplished using separate oxidation tanks where oxygen is continuously added by an air blower or similar means. However, due to differences in cleaning systems for waste combustion as opposed to fossil fuel combustion, sulfur removal or capture from waste combustion flue gas can be significantly more difficult than from that of its counterpart. Based on experience in fossil fuel combustion fields, oxidation of sulfite to sulfate is expected to occur in the flue gas treatment system condenser. Unexpectedly, when attempted, such did not occur. Faced with this unexpected problem, addition of a catalyst to the system condenser solves the problem. By placing a catalyst in the system condenser, oxidation is achieved for successful and efficient removal of $SO_2$ therefrom in accordance with Reactions 1-4 above.

Based on the above, systems and methods for the removal of $SO_2$ from flue gas produced by waste combustion to obtain cleaned flue gas were developed. In general, the present system comprises: a desulfurization stage, a quench stage and a condenser stage for the treatment of waste combustion flue gas to produce cleaned flue gas for release to the atmosphere. Likewise, steps of the present method comprise in general: providing waste combustion flue gas to a system with a desulfurization stage, a quench stage, and a condenser stage to produce a cleaned flue gas for release to the atmosphere through a stack.

The various novel features that characterize the subject systems and methods, and advantages related thereto are specified in the accompanying drawings and detailed description provided below.

BRIEF DESCRIPTION OF THE DRAWINGS

FIG. 3 is a schematic view illustrating still another embodiment of a system for removing $SO_2$ from a waste combustion flue gas according to the present invention.

DETAILED DESCRIPTION OF THE INVENTION

The combustion of waste produces flue gas comprising $SO_2$. $SO_2$ from the flue gas is poorly absorbed into solution at a pH below 5 due to the dissociation equilibrium as described with regard to Reactions 1 through 3 above. At higher pH, $SO_2$ is dissociated and forms bisulphite, which contributes to a much better absorption. If a bisulphite solution is acidified, the absorbed $SO_2$ desorbs and again escapes the solution. However, if the sulphite in solution, whether dissociated or not, is oxidized to sulphate, i.e., $SO_4^{2-}$, it will be dissociated also at low pH since the corresponding sulphuric acid, unlike suphurous acid, is a very strong acid. Hence, the sulphate is "permanently" absorbed and removed from the system sulphite equilibrium.

Figure 1:
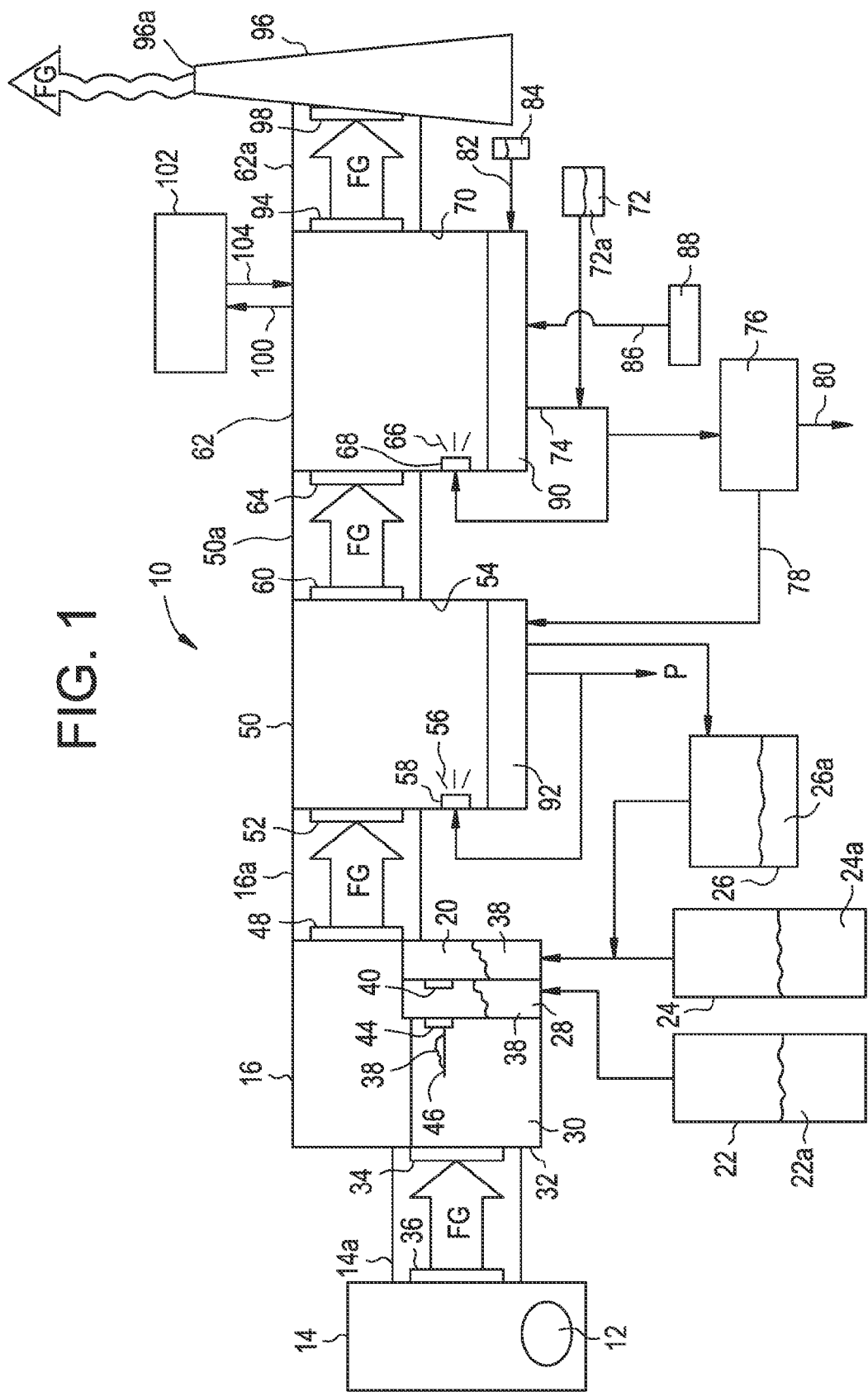
FIG. 1 is a schematic view illustrating one embodiment of a system for removing $SO_2$ from a waste combustion flue gas according to the present invention.

With the above in mind, the subject waste combustion flue gas treatment system 10 is described. As best illustrated in FIG. 1, in the subject waste combustion flue gas treatment system 10, waste 12 is combusted in boiler 14. Flue gas "FG" produced in the boiler 14 from the combustion of waste 12 flows from the boiler 14 at a temperature of approximately 125° C. to 175° C. with approximately 1000 to 1500 mg/Nm³ HCl, approximately 300 to 500 mg/Nm³ $SO_2$, approximately 10 to 25 mg/Nm³ $NH_3$ and approximately 1000 to 3000 mg/Nm³ fly ash. The quantity of flue gas FG flowing from boiler 14 depends on boiler 14 size. The boiler 14 is typically sized to where approximately 50000 to 300000 Nm³/hour of flue gas FG is produced.

The subject treatment system 10 has essentially three flue gas cleaning stages. The first cleaning stage of the subject treatment system 10 is a semidry desulfurization system 16. The semidry desulfurization system 16 is fluidly connected via duct 14a to boiler 14 for flue gas flow from opening 36 of the boiler 14 into the semidry desulfurization system 16. Semidry desulfurization system 16 comprises an absorption material 38, typically lime, supplied within a hydration chamber 20. The hydration chamber 20 is supplied solvent 22a, typically water, from a fluidly connected solvent source 22, an absorption material 24a, typically lime, from a fluidly connected material source 24 and optionally a recycled absorption material 26a from a fluidly connected recycle source 26 fluidly connected to collection tank 92. The hydration chamber 20 is fluidly connected to a mixer 28. Fluidly connected to mixer 28 is reactor 30 housed within a reaction vessel 32. Reaction vessel 32 is equipped with opening 34 through which flue gas FG flows into reaction vessel 32 and reactor 30 therein from boiler 14.

Hydration chamber 20 is generally a chamber of any commercially useful configuration. Within hydration chamber 20, an absorption material 24a, such as lime from an absorption material source 24 and optionally a recycled absorption material 26a from recycle source 26, such as recycled lime from collection tank 92, are combined to form reaction material 38. As needed for efficient operation of reactor 30, reaction material 38 is mechanically and/or gravity fed into mixer 28 via mixer opening 40. Mixer opening 40 fluidly connects hydration chamber 20 and mixer 28. Prior to reaction material 38 passing through mixer opening 40 and into mixer 28, reaction material 38 is sprayed with a predetermined amount of a solvent 22a such as water from a solvent source 22 so as to hydrate reaction material 38.

Mixer 28 is generally a mixer of any commercially useful configuration. Within mixer 28, hydrated reaction material 38 is mixed for approximately 15 to 20 seconds to achieve a moisture content throughout of approximately 5%. Once the reaction material 38 is thoroughly mixed within mixer 28 to achieve the desired moisture content throughout reaction material 38, reaction material 38 is mechanically and/or gravity fed out of mixer 28 and into reaction vessel 32 through exit opening 44. Exit opening 44 fluidly connects mixer 28 and reaction vessel 32.

As noted previously, reaction vessel 32 houses reactor 30. Reactor 30 is that portion of reaction vessel 32 where reaction material 38 enters reaction vessel 32 passing through exit opening 44 to be dispersed from dispersal ring or plate 46. Dispersal ring or plate 46 is located within reactor 30 and disperses reaction material 38 therein. It is in reactor 30 where reaction material 38 contacts, commingles and reacts with flue gas FG laden with fly ash particulates and contaminants as noted previously. Thus, it is within reactor 30 where one or more of the following exemplificative reaction(s) occur to form dry particulates, DP.

$SO_2$: $SO_2+Ca(OH)_2=CaSO_3+H_2O$            Reaction 5

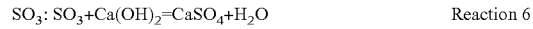

$SO_3$: $SO_3+Ca(OH)_2=CaSO_4+H_2O$            Reaction 6

With the flow of flue gas FG out of outlet 48 of reaction vessel 32 the first stage of flue gas FG cleaning is completed. Flue gas FG flowing from outlet 48 is typically approximately 125° C. to 150° C., most typically approximately 140° C., and has contaminant levels or "emissions" below the European Union norms, i.e., HCl<10 mg/Nm³, $SO_2$<50 mg/Nm³, and particulates <5 mg/Nm³.

Reaction vessel 32 is fluidly connected via duct 16a to a quench 50 by means of inlet opening 52. The second stage of flue gas FG cleaning takes place in quench 50. Within quench 50, the flue gas FG is sprayed with recirculated water 56 from nozzles 58 to fully humidify the flue gas FG and fully wet all surfaces 54 within quench 50. This stage of flue gas cleaning is operated at a relatively low pH in the range of approximately 0 to 4, or a pH of approximately 1. The reason for operating the quench 50 at a relatively low pH is for efficient absorption of ammonia and improved mercury removal. As a result of this relatively low pH, one of the primary flue gas FG contaminants, e.g., HCl, is still removed, although $SO_2$ removal is poor. In quench 50, water 56 consumption is significant due to evaporation. Also, in order to bleed off removed impurities, a relatively small liquid flow "P" is purged from quench 50. Impurities in liquid flow P may be optionally circulated back (not illustrated) to boiler 14 for combustion therein. From quench 50, flue gas FG flows through exit opening 60 to a fluidly connected condenser 62. Upon flue gas FG exit from quench 50, the second stage of flue gas FG cleaning is complete. Flue gas FG exiting quench 50 through exit opening 60 has approximately 100 percent humidity at approximately 65° C., and has impurity levels comprising HCl<2 mg/Nm$^3$ and NH$_3$<5 mg/Nm$^3$.

From quench 50, flue gas FG flows through duct 50a and into fluidly connected condenser 62 via opening 64. The subject condenser 62 may be of any of a variety of known types, such as for example a direct contact condenser, e.g., a packed tower or a spray scrubber, or an indirect condenser, e.g., tube and shell heat exchangers. Regardless of which type condenser 62 is used, a water recirculation spray 66 through nozzles 68 is always included in condenser 62 to keep condenser surfaces 70 wet and to further clean the flue gas FG flowing therethrough. This, the third stage of flue gas FG cleaning, taking place in condenser 62 is used to remove remaining SO$_2$ from the flue gas FG. As such, NaOH 72a is added from a NaOH supply source 72 to maintain a pH of approximately 5.0 to 7.5, or approximately 6.0 to 6.5, in the condenser 62. Cooling of the flue gas FG that occurs in condenser 62 results in a significant flow of excess water or condensate 74 produced from the humidity of the entering flue gas FG. Condenser 62 produces approximately 5 to 15 m$^3$/hour of condensate 74. Condensate 74 so produced contains sodium and SO$_2$ as the primary impurities.

Condensate 74 is cleaned in a membrane reverse osmosis system 76 or similar purification system. In system 76, heavy metals, sulphurous compounds, chloride compounds and the like are removed in a concentrate water flow 78. Approximately 20 to 30 percent of condensate 74 forms concentrate water flow 78, which carries approximately >95 percent of the impurities entering system 76. The resultant concentrated water flow 78 is circulated to collection tank 92 of quench 50 for use as make-up water. Clean water 80 is also produced by system 76, which is useful for other purposes.

It is at this point in the subject system and process where a significant problem becomes evident. The problem is that since SO$_2$ captured in condenser 62 will be acidified in quench 50 upon circulation of the concentrated water flow 78 thereto, SO$_2$ will be emitted from the concentrate water flow 78 to the flue gas FG unless it has been oxidized. This leads to an increase of SO$_2$/sulphite concentrations in condenser 62 and quench 50. Experience in wet flue gas desulfurization (WFGD) of flue gas from fossil fuel combustion proves that oxidation is typically sufficient to oxidize SO$_2$ and thus avoid SO$_2$/sulphite increases.

Without being bound to any one mechanism, it appears that the subject system fails and results in an increase of SO$_2$/sulphite concentrations in condenser 62 and quench 50 due to the operation being too clean. Iron and manganese radicals are active in promoting the reactions described above, and are abundant in WFGD. As such, to solve the problem of increasing of SO$_2$/sulphite concentrations in condenser 62 and quench 50, a relatively small amount, such as approximately 0.0001 to 0.200 mM, or approximately 0.020 mM of an oxidation catalyst 82, such as FeSO4 or the like, is added to condenser 62. Optionally, in addition to or in place of adding an oxidation catalyst 82 from a catalyst supply source 84, air and/or oxygen 86 from an oxygen supply source 88 may be injected into and optionally mechanically stirred (not shown) into collection tank 90 of condenser 62 for forced oxidation therein.

With the addition of an oxidation catalyst 82 and/or oxygen 86 to condenser 62, flue gas FG flowing from opening 94 of condenser 62 meets and/or exceeds emissions standards and considered "clean" for release to the atmosphere by release through a stack 96. As such, flue gas FG flows out of opening 94 of condenser 62 via duct 62a and into fluidly connected stack 96 though opening 98 for release therefrom into the atmosphere via opening 96a.

An additional benefit of the subject system 10 and method is that heat 100 recovered from the cooling of the flue gas FG in condenser 62 may be used in a district heating system 102. As such, heat 100 from condenser 62 is used in the district heating system 102 and then returned to condenser 62 as coolant 104 for cooling the flue gas FG in condenser 62.

Figure 2:
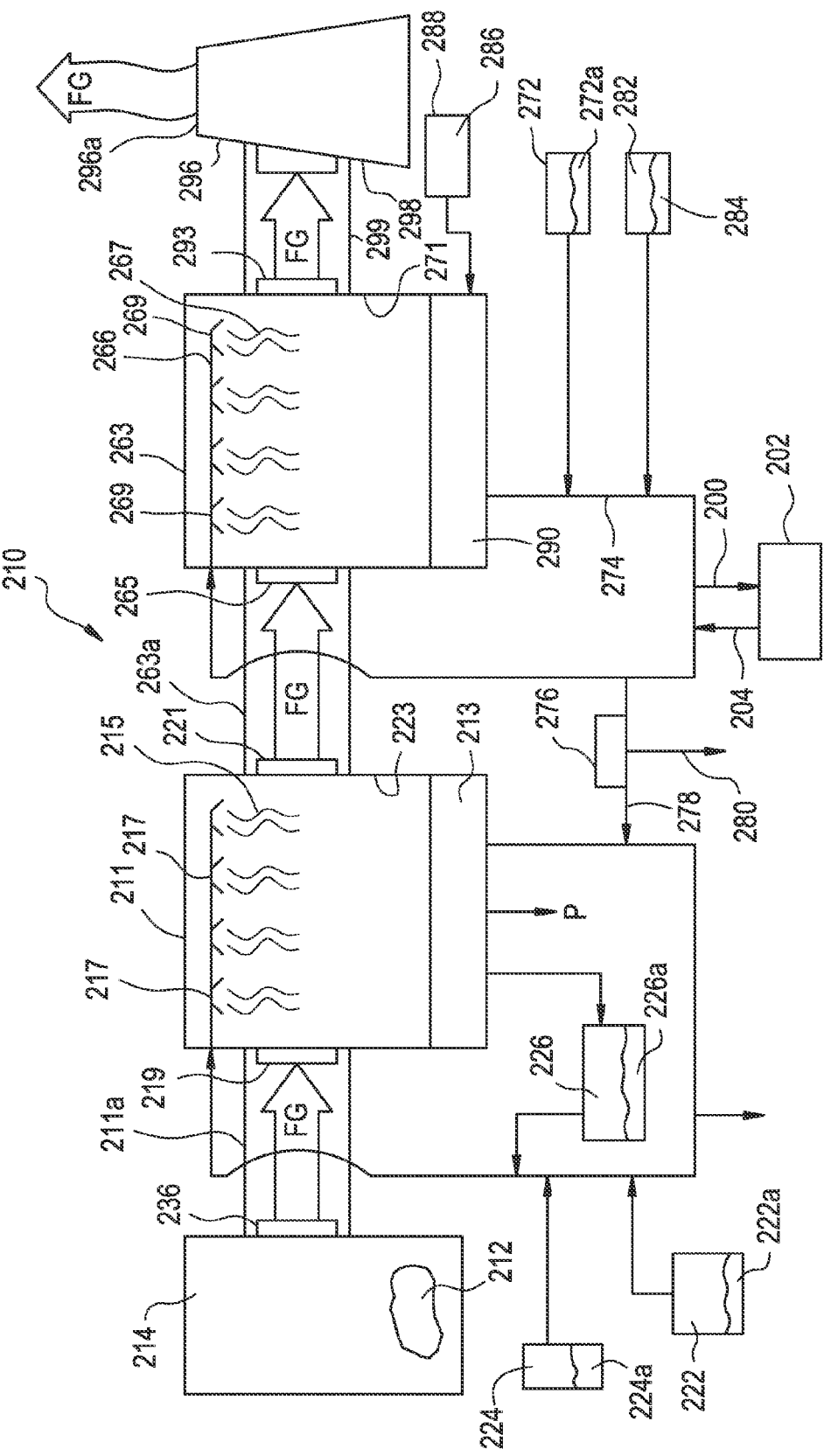
FIG. 2 is a schematic view illustrating another embodiment of a system for removing $SO_2$ from a waste combustion flue gas according to the present invention.

Schematically illustrated in FIG. 2, is another embodiment of the subject system and method. The system illustrated in FIG. 2 has features in common with those illustrated in FIG. 1. As such, features illustrated in FIG. 2 common to those of FIG. 1 are signified using the same numbers but with the number "2" preceding them.

Now referring to FIG. 2, in this embodiment of the subject waste combustion flue gas treatment system 210, waste 212 is combusted in boiler 214. Flue gas FG produced in the boiler 214 from the combustion of waste 212 flows from the boiler 214 at a temperature of approximately 125° C. to 175° C. with approximately 1000 to 1500 mg/Nm$^3$ HCl, approximately 300 to 500 mg/Nm$^3$ SO$_2$, approximately 10 to 25 mg/Nm$^3$ NH$_3$ and approximately 1000 to 3000 mg/Nm$^3$ fly ash. The quantity of flue gas FG flowing from boiler 214 depends on boiler 214 size. The boiler 214 is typically sized to where approximately 50000 to 300000 Nm$^3$/hour of flue gas FG is produced.

The subject treatment system 210 has essentially two flue gas cleaning stages. The first cleaning stage of the subject treatment system 210 is a combination wet desulfurization system and quench 211. The combination wet desulfurization system and quench 211 is fluidly connected to boiler 214 via duct 211a for flue gas flow from opening 236 of boiler 214 into opening 219 of combination wet desulfurization system and quench 211. The combination wet desulphurization system and quench 211 is supplied solvent 222a, typically water, from a fluidly connected solvent source 222, an absorption material 224a, typically lime, from a fluidly connected material source 224 and optionally a recycled absorption material 226a from a fluidly connected recycle source 226. In collection tank 213 of combination wet desulphurization system and quench 211, solvent 222a, absorption material 224a and recycled absorption material 226a are combined to form a slurry 215. Slurry 215 is sprayed from nozzles 217 for contract with flue gas FG flowing therethrough thereby cleaning flue gas FG flowing therethrough. As such, flue gas FG flows from boiler 214 into fluidly connected combination wet desulphurization system and quench 211 through opening 219, is cleaned, and exits through opening 221.

Combination wet desulphurization system and quench 211 is generally a chamber of any commercially useful configuration. In combination wet desulfurization system and quench 211, an absorption material 224a, such as lime from an absorption material source 224 and optionally a recycled absorption material 226a from recycle source 226, such as recycled lime from collection tank 213, are combined with a solvent 222a, such as water, from a solvent source 222 to form a slurry 215. As needed for efficient operation of combination wet desulphurization system and quench 211, slurry 215 is sprayed from nozzles 217 within combination wet desulphurization system and quench 211. It is in combination wet desulphurization system and quench 211 where slurry 215 contacts, commingles and reacts with flue gas FG laden with fly ash particulates and contaminants as noted previously. Thus, it is within combination wet desulphurization system and quench 211 where one or more of Reactions 5 and 6 above occur.

Within combination wet desulphurization system and quench 211, flue gas FG is sprayed with slurry 215 including solvent 222a from nozzles 217 to fully humidify the flue gas FG and fully wet all surfaces 223 within combination wet desulphurization system and quench 211. This first stage of flue gas cleaning is operated at a relatively low pH in the range of approximately 0 to 4, or a pH of approximately 1. The reason for operating the combination wet desulphurization system and quench 211 at a relatively low pH is for efficient absorption of ammonia and improved mercury removal. As a result of this relatively low pH, one of the primary flue gas FG contaminants, e.g., HCl, is still removed, although $SO_2$ removal is poor. In combination wet desulphurization system and quench 211, solvent 222a consumption is significant due to evaporation. Also, in order to bleed off removed impurities, a relatively small liquid flow "P" is purged from combination wet desulphurization system and quench 211. Optionally, impurities in liquid flow P may be circulated (not shown) to boiler 214 for combustion therein. With the flow of flue gas FG out of opening 221 of combination wet desulphurization system and quench 211, the first stage of flue gas FG cleaning is completed. Flue gas FG flowing from opening 221 typically has a humidity of approximately 100 percent at approximately 65° C., and has impurity levels comprising $HCl<2$ $mg/Nm^3$ and $NH_3<5$ $mg/Nm^3$.

From combination wet desulphurization system and quench 211, flue gas FG enters fluidly connected combination wet desulphurization system and condenser 263 via duct 263a and opening 265. The subject combination wet desulphurization system and condenser 263 may include any of a variety of known condenser types, such as for example a direct contact condenser, e.g., a packed tower or a spray scrubber (266), or an indirect condenser, e.g., tube and shell heat exchangers. Regardless of which type condenser 266 is used in combination wet desulphurization system and condenser 263, a water recirculation spray 267 through nozzles 269 is always included in condenser 266 to keep combination wet desulphurization system and condenser 263 surfaces 271 wet and to further clean the flue gas FG flowing therethrough. This, the second stage of flue gas FG cleaning, taking place in combination wet desulphurization system and condenser 263 is used to remove remaining $SO_2$ from the flue gas FG. As such, NaOH 272a is added from a NaOH supply source 272 to maintain a pH of approximately 5.0 to 7.5, or approximately 6.0 to 6.5, in the combination wet desulphurization system and condenser 263. Cooling of the flue gas FG that occurs in combination wet desulphurization system and condenser 263 results in a significant flow of excess water or condensate 274 produced from the humidity of the entering flue gas FG. Combination wet desulphurization system and condenser 263 produces approximately 5 to 15 $m^3$/hour of condensate 274. Condensate 274 so produced contains some sodium and $SO_2$ as the primary impurities.

Condensate 274 is optionally cleaned in a membrane reverse osmosis system 276 or similar purification system. In system 276, heavy metals, sulphurous compounds, chloride compounds and the like are removed in a concentrate water flow 278. Approximately 20 to 30 percent of condensate 274 forms concentrate water flow 278, which carries approximately >95 percent of the impurities entering system 276. The resultant concentrated water flow 278 is circulated to collection tank 213 of combination wet desulphurization system and quench 211 for use as make-up water. Clean water 280 is also produced by system 276, which is useful for other purposes.

As noted above, it is at this point in the subject system 210 and process where a significant problem becomes evident. The problem is that since $SO_2$ captured in combination wet desulphurization system and condenser 263 will be acidified in combination wet desulphurization system and quench 211 upon circulation of the concentrated water flow 278 thereto, $SO_2$ will be emitted from the concentrate water flow 278 to the flue gas FG unless it has been oxidized. This leads to an increase of $SO_2$/sulphite concentrations in combination wet desulphurization system and condenser 263 and combination wet desulphurization system and quench 211. Experience in wet flue gas desulfurization (WFGD) of flue gas from fossil fuel combustion proves that oxidation is typically sufficient to oxidize $SO_2$ and thus avoid $SO_2$/sulphite increases.

Without being bound to any one mechanism, it appears that the subject system fails and results in an increase of $SO_2$/sulphite concentrations due to the fact the operation is too clean. Iron and manganese radicals are active in promoting the reactions described above, and are abundant in WFGD. As such, to solve the problem of increasing of $SO_2$/sulphite concentrations, a relatively small amount, such as approximately 0.0001 to 0.200 mM, or approximately 0.020 mM of an oxidation catalyst 282, such as $FeSO_4$ or the like from a catalyst supply source 284 is added to combination wet desulphurization system and condenser 263. Optionally, in addition to or in place of adding an oxidation catalyst 282 from a catalyst supply source 284, air and/or oxygen 286 from an oxygen supply source 288 may be injected into and/or optionally mechanically stirred (not shown) into collection tank 290 of combination wet desulphurization system and condenser 263 for forced oxidation therein.

Optionally if desired but not illustrated in FIG. 2, NaOH 272a from a NaOH supply source 272, oxidation catalyst 282 from a catalyst supply source 284, and/or air and/or oxygen 286 from an oxygen supply source 288, may likewise be added to the solvent 222a spray of combination wet desulphurization system and quench 211.

With the addition of an oxidation catalyst 282 and/or oxygen 286 to combination wet desulphurization system and condenser 263, flue gas FG flowing outwardly from opening 293 of combination wet desulphurization system and condenser 263 meets and/or exceeds emissions standards and considered "clean" for release to the atmosphere by release through a stack 296. As such, flue gas FG flows out of opening 293 of combination wet desulphurization system and condenser 263 and into fluidly connected stack 296 via duct 299 and opening 298 for release therefrom into the atmosphere through opening 296a.

An additional benefit of the subject system and method is that optionally, heat 200 recovered from the cooling of the flue gas FG in the combination wet desulphurization system and condenser 263 may be used in a district heating system 202. As such, heat 200 from combination wet desulphurization system and condenser 263 is used in the district heating system 202 and then returned to combination wet desulphurization system and condenser 263 as coolant 204 for cooling the flue gas FG in the combination wet desulphurization system and condenser 263.

Schematically illustrated in FIG. 3, is still another embodiment of the subject system and method. The system illustrated in FIG. 3 has features in common with those illustrated in FIG. 1. As such, features illustrated in FIG. 3 common to those of FIG. 1 are signified using the same numbers but with the number "3" preceding them.

Now referring to FIG. 3, in this embodiment of the subject waste combustion flue gas treatment system 310, waste 312 is combusted in boiler 314. Flue gas FG produced in the boiler 314 from the combustion of waste 312 flows from opening 336 of boiler 314 at a temperature of approximately 125° C. to 175° C. with approximately 1000 to 1500 mg/Nm$^3$ HCl, approximately 300 to 500 mg/Nm$^3$ $SO_2$, approximately 10 to 25 mg/Nm$^3$ $NH_3$ and approximately 1000 to 3000 mg/Nm$^3$ fly ash. The quantity of flue gas FG flowing from boiler 314 depends on boiler 314 size. The boiler 314 is typically sized to where approximately 50000 to 300000 Nm$^3$/hour of flue gas FG is produced.

The subject treatment system 310 has essentially one flue gas cleaning stage. This one cleaning stage of the subject treatment system 310 takes place in a combination wet desulfurization system and condenser 311. The combination wet desulfurization system and condenser 311 is fluidly connected to boiler 314 via duct 311a for flue gas flow from the boiler 314 into the combination wet desulfurization system and condenser 311 via opening 319. The combination wet desulphurization system and condenser 311 is supplied solvent 322a, typically water, from a fluidly connected solvent source 322, an absorption material 324a, typically lime, from a fluidly connected material source 324 and optionally a recycled absorption material 326a from a fluidly connected recycle source 326. In collection tank 313 of combination wet desulphurization system and condenser 311, solvent 322a, absorption material 324a and recycled absorption material 326a are combined to form a slurry 315. Slurry 315 is sprayed from nozzles 317 for contract with flue gas FG flowing therethrough thereby cleaning flue gas FG flowing therethrough. As such, flue gas FG flows from boiler 314 into fluidly connected combination wet desulphurization system and condenser 311 through opening 319 and exits through opening 321.

Combination wet desulphurization system and condenser 311 is generally a chamber of any commercially useful configuration. Combination wet desulphurization system and condenser 311, an absorption material 324a, such as lime from an absorption material source 324 and optionally a recycled absorption material 326a from recycle source 326, such as recycled lime from collection tank 313, are combined with a solvent 322a, such as water, from a solvent source 322 to form a slurry 315. As needed for efficient operation of combination wet desulphurization system and condenser 311, slurry 315 is sprayed from nozzles 317 within combination wet desulphurization system and condenser 311. It is in combination wet desulphurization system and condenser 311 where slurry 315 contacts, commingles and reacts with flue gas FG laden with fly ash particulates and contaminants as noted previously. Thus, it is within combination wet desulphurization system and condenser 311 where one or more of Reactions 5 and 6 above occur. Within combination wet desulphurization system and condenser 311, the flue gas FG is sprayed with slurry 315 including solvent 322a from nozzles 317 to fully humidify the flue gas FG and fully wet all surfaces 323 within combination wet desulphurization system and condenser 311.

The subject combination wet desulphurization system and condenser 311 may include any of a variety of known condenser types, such as for example a direct contact condenser, e.g., a packed tower or a spray scrubber (365), or an indirect condenser, e.g., tube and shell heat exchangers. Regardless of which type condenser 365 is used in combination wet desulphurization system and condenser 311, a recirculation spray 367 through nozzles 317 is always included in condenser 365 to keep combination wet desulphurization system and condenser 311 surfaces 323 wet and to further clean the flue gas FG flowing therethrough. The flue gas FG cleaning taking place in combination wet desulphurization system and condenser 311 is used to remove remaining $SO_2$ from the flue gas FG. As such, NaOH 372a is added from a NaOH supply source 372 to maintain a pH of approximately 5.0 to 7.5, or approximately 6.0 to 6.5, in the combination wet desulphurization system and condenser 311. Cooling of the flue gas FG that occurs in combination wet desulphurization system and condenser 311 results in a significant flow of excess water or condensate 374 produced from the humidity of the entering flue gas FG. Combination wet desulphurization system and condenser 311 produces approximately 5 to 15 m$^3$/hour of condensate 374. Condensate 374 so produced contains $Na_2SO_4$ as the primary impurity.

Condensate 374 is optionally cleaned in a membrane reverse osmosis system 376 or similar purification system. In system 376, heavy metals, sulphurous compounds, chloride compounds and the like are removed in a concentrate water flow 378. Approximately 20 to 30 percent of condensate 374 forms concentrate water flow 378, which carries approximately >95 percent of the impurities entering system 376. The resultant concentrated water flow 378 is circulated to collection tank 313 of combination wet desulphurization system and condenser 311 for use as make-up water. Clean water 380 is also produced by system 376, which is useful for other purposes.

As noted above, it is at this point in the subject system and process where a significant problem may be encountered. The problem encountered may be an increase of $SO_2$/sulphite concentrations in the combination wet desulphurization system and condenser 311. To solve the problem of increasing of $SO_2$/sulphite concentrations, a relatively small amount, such as approximately 0.0001 to 0.200 mM, or approximately 0.020 mM of an oxidation catalyst 382, such as $FeSO_4$ or the like is added to combination wet desulphurization system and condenser 311. Optionally, in addition to or in place of adding an oxidation catalyst 382 from a catalyst supply source 384, air and/or oxygen 386 from an oxygen supply source 388 may be injected into and/or optionally mechanically stirred (not shown) into collection tank 313 of combination wet desulphurization system and condenser 311 for forced oxidation therein.

With the addition of an oxidation catalyst 382 and/or oxygen 386 to combination wet desulphurization system and condenser 311, flue gas FG flowing outwardly from opening 321 of combination wet desulphurization system and condenser 311 meets and/or exceeds emissions standards and considered "clean" for release to the atmosphere by release through a stack 396. As such, flue gas FG flows out of opening 321 of combination wet desulphurization system and condenser 311 and into fluidly connected duct 396a and fluidly connected opening 398 of stack 396 for release therefrom into the atmosphere via opening 399.

An additional benefit of the subject system 310 and method is that optionally, heat 300 recovered from the cooling of the flue gas FG in combination wet desulphurization system and condenser 311 may be used in a district heating system 302. As such, heat 300 from combination wet desulphurization system and condenser 311 is used in the district heating system 302 and then returned to combination wet desulphurization system and condenser 311 as coolant 304 for cooling the flue gas FG in combination wet desulphurization system and condenser 311.

Methods of using the system embodiments illustrated in FIGS. 1-3 and described above are useful for removing $SO_2$ from flue gas produced by waste combustion. One such method of using the subject system entails flowing waste combustion flue gas through three cleaning stages to remove $SO_2$ from the flue gas comprising $SO_2$ to produce cleaned flue gas for release of the cleaned flue gas to the atmosphere via a stack. As such, waste combustion flue gas is passed through a semi-dry flue gas desulfurization system, a quench and a condenser to produce cleaned flue gas. In the semi-dry flue gas desulfurization system, the waste combustion flue gas is contacted with a solvent moistened absorption material and/or recycled absorption material to form dry particulates in accordance with Reactions 5 and 6 above. The waste combustion flue gas then flows through a quench where it is sprayed with recirculated water to fully humidify the waste combustion flue gas under relatively low pH conditions in the range of approximately 0 to 4, or a pH of approximately 1. From the quench, the waste combustion flue gas flows through a condenser where it is sprayed with a water recirculation spray, NaOH from an NaOH supply source to maintain a pH of approximately 5.0 to 7.5, or approximately 6.0 to 6.5, in the condenser, and a relatively small amount of an oxidation catalyst, such as $FeSO_4$. Through this three step cleaning method, waste combustion flue gas is cleaned to produce cleaned flue gas for release to the atmosphere via an associated stack. An additional benefit to the method so described is the optional use of heat energy from the system condenser in a district heating system and/or optional cleaning of condensation water from the condenser by a reverse osmosis system for uses of the so produced water outside the subject system.

Another method of using the subject system entails flowing waste combustion flue gas through two cleaning stages to remove $SO_2$ from the flue gas comprising $SO_2$ to produce cleaned flue gas for release of the cleaned flue gas to the atmosphere via a stack. As such, waste combustion flue gas is passed through a combination wet desulfurization system and quench and a combination wet desulfurization system and condenser to produce cleaned flue gas. In the combined wet desulfurization system and quench, the waste combustion flue gas is contacted with a solvent and absorption material slurry, which may or may not include recycled absorption material. As the waste combustion flue gas flows through combination wet desulfurization system and quench it is sprayed with the slurry and recirculated water to fully humidify the waste combustion flue gas under relatively low pH conditions in the range of approximately 0 to 4, or a pH of approximately 1. From the combination wet desulfurization system and quench, the waste combustion flue gas flows through a wet desulfurization system and condenser where it is sprayed with a water recirculation spray, NaOH from an NaOH supply source to maintain a pH of approximately 5.0 to 7.5, or approximately 6.0 to 6.5, in the condenser, and a relatively small amount of an oxidation catalyst, such as $FeSO_4$. Through this two step cleaning method, waste combustion flue gas is cleaned to produce cleaned flue gas for release to the atmosphere via an associated stack. An additional benefit to the method so described is the optional use of heat energy from the combination wet desulfurization system and condenser in a district heating system and/or optional cleaning of condensation water from the combined wet desulfurization system and condenser by a reverse osmosis system for uses of the so produced water outside the subject system.

Still another method of using the subject system entails flowing waste combustion flue gas through one cleaning stage to remove $SO_2$ from the flue gas comprising $SO_2$ to produce cleaned flue gas for release of the cleaned flue gas to the atmosphere via a stack. As such, waste combustion flue gas is passed through a combination wet desulfurization system and condenser to produce cleaned flue gas. In the combined wet desulfurization system and condenser, the waste combustion flue gas is contacted with a solvent and absorption material slurry, which may or may not include recycled absorption material. As the waste combustion flue gas flows through combination wet desulfurization system and condenser, it is sprayed with the slurry and recirculated water to fully humidify the waste combustion flue gas. The waste combustion flue gas flowing through the wet desulfurization system and condenser also is sprayed with NaOH from an NaOH supply source to maintain a pH of approximately 5.0 to 7.5, or approximately 6.0 to 6.5 in the condenser, and a relatively small amount of an oxidation catalyst, such as $FeSO_4$. Through this one step cleaning method, waste combustion flue gas is cleaned to produce cleaned flue gas for release to the atmosphere via an associated stack. An additional benefit to the method so described is the optional use of heat energy from the combination wet desulfurization system and condenser in a district heating system and/or optional cleaning of condensation water from the combined wet desulfurization system and condenser by a reverse osmosis system for uses of the so produced water outside the subject system.

While the present invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for removing $SO_2$ from waste combustion flue gas containing $SO_2$ comprising:
   flowing the flue gas through a desulfurization system for contact with a solvent moistened absorption material;
   flowing the flue gas through a recirculated water quench for contact with recirculated water at a relatively low pH; and
   flowing the flue gas through a condenser for contact with a water spray, NaOH and an oxidizing catalyst to produce cleaned flue gas for release to the atmosphere.

2. A method for removing $SO_2$ from waste combustion flue gas containing $SO_2$ comprising:
   flowing the flue gas through a combination wet desulfurization system and quench for contact with an absorption material slurry and recirculated water at a relatively low pH; and
   flowing the flue gas through a combination wet desulfurization system and condenser for contact with a water spray, NaOH and an oxidizing catalyst to produce cleaned flue gas for release to the atmosphere.

3. A method for removing $SO_2$ from waste combustion flue gas containing $SO_2$ comprising:
   flowing the flue gas through a combination wet desulfurization system and condenser for contact with a recirculated water spray, NaOH and an oxidizing catalyst to produce cleaned flue gas for release to the atmosphere.

4. The method of claim 1, 2 or 3, further comprising:
   providing air, oxygen or an oxygen enriched gas to the quench, combined wet desulfurization system and quench, condenser, combined wet desulfurization system and condenser or a combination thereof to promote oxidation therein.

5. The method of claim 1, 2 or 3, wherein said oxidizing catalyst is $FeSO_4$.

6. The method of claim 1, 2 or 3, wherein said oxidizing catalyst is 0.0001 to 0.200 mM of $FeSO_4$.

7. The method of claim 1, 2 or 3, wherein said pH in said condenser is 5.0 to 7.5.

8. A system for removing $SO_2$ from waste combustion flue gas containing $SO_2$ comprising:
   a semi-dry desulfurization system for contacting the flue gas with a solvent moistened absorption material;
   a recirculated water quench for contacting the flue gas with recirculated water at a relatively low pH;
   a condenser for contacting the flue gas with a water spray;
   an NaOH supply supplying NaOH to the condenser; and
   an oxidizing catalyst supply supplying oxidizing catalyst to the condenser to produce cleaned flue gas for release to the atmosphere.

9. A system for removing $SO_2$ from waste combustion flue gas containing $SO_2$ comprising:
   a combination wet desulfurization system and quench for contacting the flue gas with an absorption material slurry and recirculated water at a relatively low pH;
   a combination wet desulfurization system and condenser for contacting the flue gas with a water spray;
   a NaOH supply for supplying NaOH to the combination wet desulfurization system and condenser for contacting the flue gas and water spray; and
   an oxidizing catalyst supply for supplying oxidizing catalyst to the combination wet desulfurization system and condenser for contacting the flue gas and water spray to produce cleaned flue gas for release to the atmosphere.

10. A system for removing $SO_2$ from waste combustion flue gas containing $SO_2$ comprising:
    a combination wet desulfurization system and condenser for contacting the flue gas with a recirculated water spray;
    a NaOH supply for supplying NaOH to the combination wet desulfurization system and condenser for contacting the flue gas; and
    an oxidizing catalyst supply for supplying oxidizing catalyst to the combination wet desulfurization system and condenser for contacting the flue gas to produce cleaned flue gas for release to the atmosphere.

11. The system of claim 8, 9 or 10, further comprising:
    an oxygen supply source to provide air, oxygen, or an oxygen enriched gas to the system to promote oxidation therein.

12. The system of claim 8, 9 or 10, wherein said oxidizing catalyst is $FeSO_4$.

13. The system of claim 8, 9 or 10, wherein said oxidizing catalyst is 0.0001 to 0.200 mM of $FeSO_4$.

14. The system of claim 8, 9 or 10 wherein said pH in said condenser or combined wet desulfurization system and condenser is 5.0 to 7.5.

15. The system of claim 8, 9 or 10, wherein heat from said condenser or combined wet desulfurization system and condenser is used in a district heating system.

* * * * *